(12) United States Patent
Paulhill

(10) Patent No.: US 6,481,126 B2
(45) Date of Patent: Nov. 19, 2002

(54) LOCKABLE LICENSE PLATE HOLDER

(76) Inventor: Philip B. Paulhill, 6115 N. 11th, Philadelphia, PA (US) 19141

( * ) Notice: Subject to any disclaimer, the term of this patent is extended or adjusted under 35 U.S.C. 154(b) by 78 days.

(21) Appl. No.: 09/745,574

(22) Filed: Dec. 21, 2000

(65) Prior Publication Data

US 2002/0078608 A1 Jun. 27, 2002

(51) Int. Cl.[7] .................................................. G09F 7/00
(52) U.S. Cl. .............................. 40/202; 40/209; 70/232; 70/DIG. 57
(58) Field of Search .......................... 40/201, 202, 203, 40/209, 655, 712; 70/229, 232, DIG. 57; D12/193

(56) References Cited

U.S. PATENT DOCUMENTS

| | | | | |
|---|---|---|---|---|
| 2,869,261 A | * | 1/1959 | Audette | 40/209 |
| 3,945,227 A | * | 3/1976 | Reiland | 70/DIG. 57 X |
| 5,012,602 A | | 5/1991 | Storey | |
| 5,381,618 A | * | 1/1995 | Singleton | 40/202 |
| 5,392,619 A | | 2/1995 | Dunaway | |
| 5,404,664 A | | 4/1995 | Brooks et al. | |
| 5,983,539 A | | 11/1999 | Martin et al. | |
| 6,286,238 B1 | * | 9/2001 | Harrington | 40/202 |
| 6,305,107 B1 | * | 10/2001 | Parenti | 40/201 |

* cited by examiner

*Primary Examiner*—Brian K. Green
(74) *Attorney, Agent, or Firm*—Henderson & Sturm LLP

(57) ABSTRACT

A lockable license plate holder for securing a license plate via a plurality of conventional fasteners to a vehicle wherein the license plate holder includes a license plate holder housing member provided with an open generally rectangular framework element having an upper portion and a lower portion provided with a plurality of apertured mounting tabs dimensioned to receive the conventional fasteners, and a locking unit including a lock member operatively connected to a pair of locking arms provided with a plurality of cover tabs that will selectively cover and expose the apertured mounting tabs in response to the position of the lock member. In addition, the interior of the open framework element is further provided with at least one bracket element that is dimensioned to surround a registration decal provided on most state license plates.

9 Claims, 3 Drawing Sheets

LOCKABLE LICENSE PLATE HOLDER

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to the field of lockable license plate holders in general and in particular to a shiftable cover arrangement to block the mounting screws that attach the license tags to a vehicle framework.

2. Description of Related Art

As can be seen by reference to the following U.S. Pat. Nos. 5,392,619; 5,983,539; 5,012,602; and 5,404,664, the prior art is replete with myriad and diverse license plate securing arrangements.

While all of the aforementioned prior art constructions are more than adequate for the basic purpose and function for which they have been specifically designed, they are uniformly deficient with respect to their failure to provide a simple, efficient, and practical license plate holder arrangement which selectively covers and uncovers the mounting screws that are employed to affix the license plate and license plate holder to a vehicle framework.

As most car owners are aware, there has been a recent surge in the occurrence of license plate thefts which represents a major inconvenience for any vehicle owner who has been the victim of this type of theft.

As a consequence of the foregoing situation, there has existed a longstanding need for a new and improved lockable license plate holder that effectively covers the mounting screws that attach the holder framework to the license plate and the license plate to the vehicle framework; and the provision of such a construction is the stated objective of the present invention.

BRIEF SUMMARY OF THE INVENTION

Briefly stated, the lockable license plate holder that forms the basis of the present invention comprises in general a holder unit and a locking unit disposed within the holder unit and adapted to selectively cover and uncover the conventional fasteners that are routinely employed to affix a license plate and license plate holder to a vehicle framework in a well recognized manner.

As will be explained in greater detail further on in the specification, the holder unit comprises a license plate holder housing member including an outer open generally rectangular framework element having a generally U-shaped hollow passageway formed therein which is further provided with a plurality of apertured mounting tabs and a lower slot which accommodate portions of the locking unit; and an inner bracket that cooperates with the outer framework element to protect the registration decal.

In addition, the rear face of the license plate holder housing member is provided with a plurality of apertured mounting tabs which are dimensioned to receive a like plurality of conventional fasteners for captively engaging the license plate between the license plate holder and a vehicle framework.

Furthermore, the locking unit includes a lock member operatively associated with a pair of locking arms slideably disposed respectively in the upper and lower portions of the framework element and having a plurality of cover tabs that extend through the slots in the framework element and are selectively movable from a covering to an exposed relationship relative to said apertured mounting tabs.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein.

DETAILED DESCRIPTION OF THE INVENTION

Figures 1, 2:
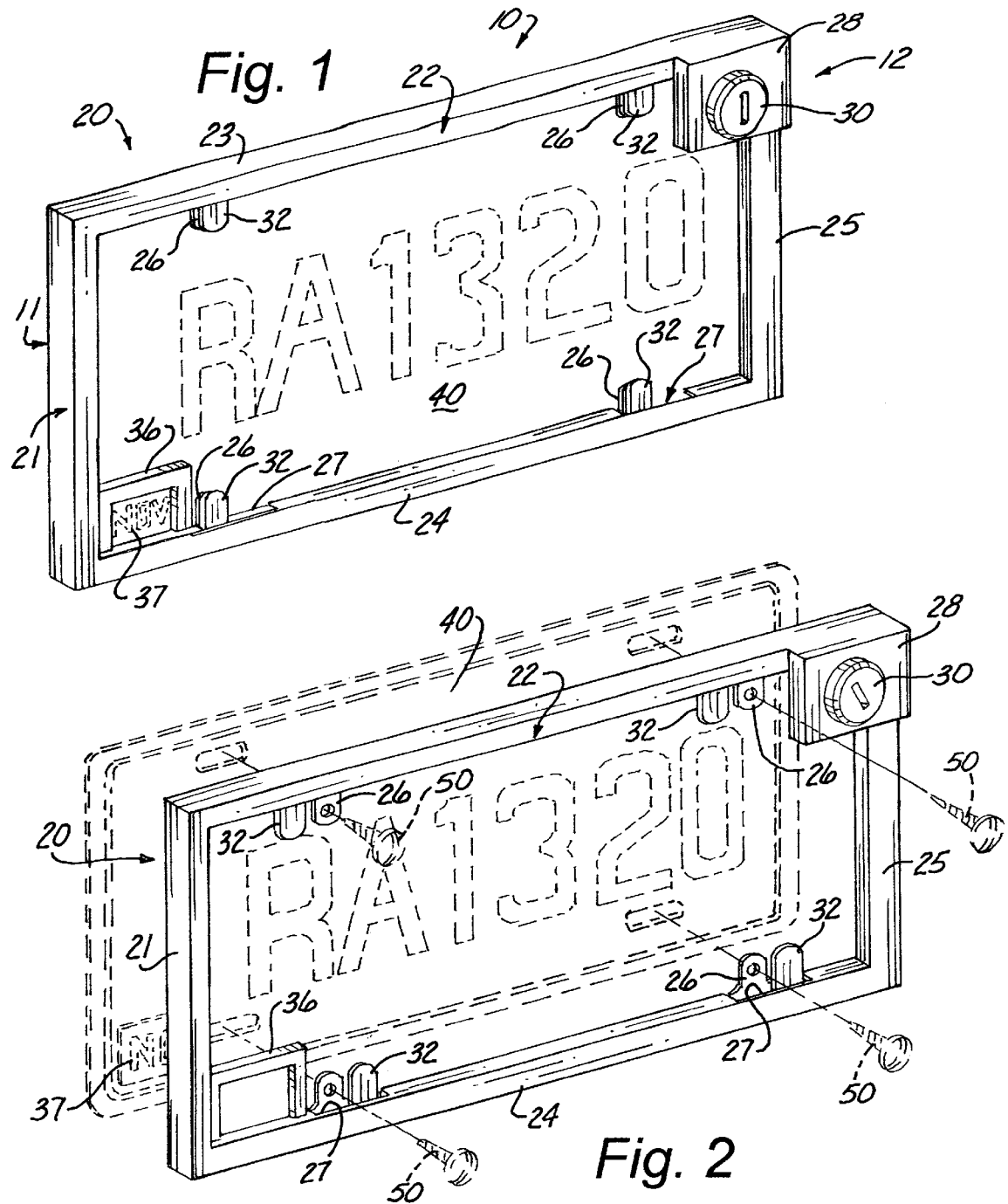
FIG. 1 is a perspective view of the lockable license plate holder in the locked position.
FIG. 2 is a perspective view of the lockable license plate holder in the unlocked position.

As can be seen by reference to the drawings, and in particular to FIG. 1, the lockable license plate holder that forms the basis of the present invention is designated generally by the reference number 10. The license plate holder 10 comprises in general a holder unit 11 and a locking unit 12. These units will now be described in seriatim fashion.

As can best be seen by reference to FIGS. 1 and 2, the holder unit 11 comprises a license plate holder housing member 20 including an open generally rectangular framework element 21 having a hollow passageway 22 that extends at least from the upper portion 23 of the framework element 21 to the lower portion 24 and along one side 25 for reasons that will be explained presently.

In addition, the upper 23 and lower 24 portions of the framework element 21 are provided with a plurality of apertured mounting tabs 26 disposed adjacent to a plurality of slots 27; and, the framework element 21 is further provided with an outwardly projecting extension 28 wherein the slots 27 and the extension 28 are dimensioned to accommodate portions of the locking unit 12.

Figure 3:
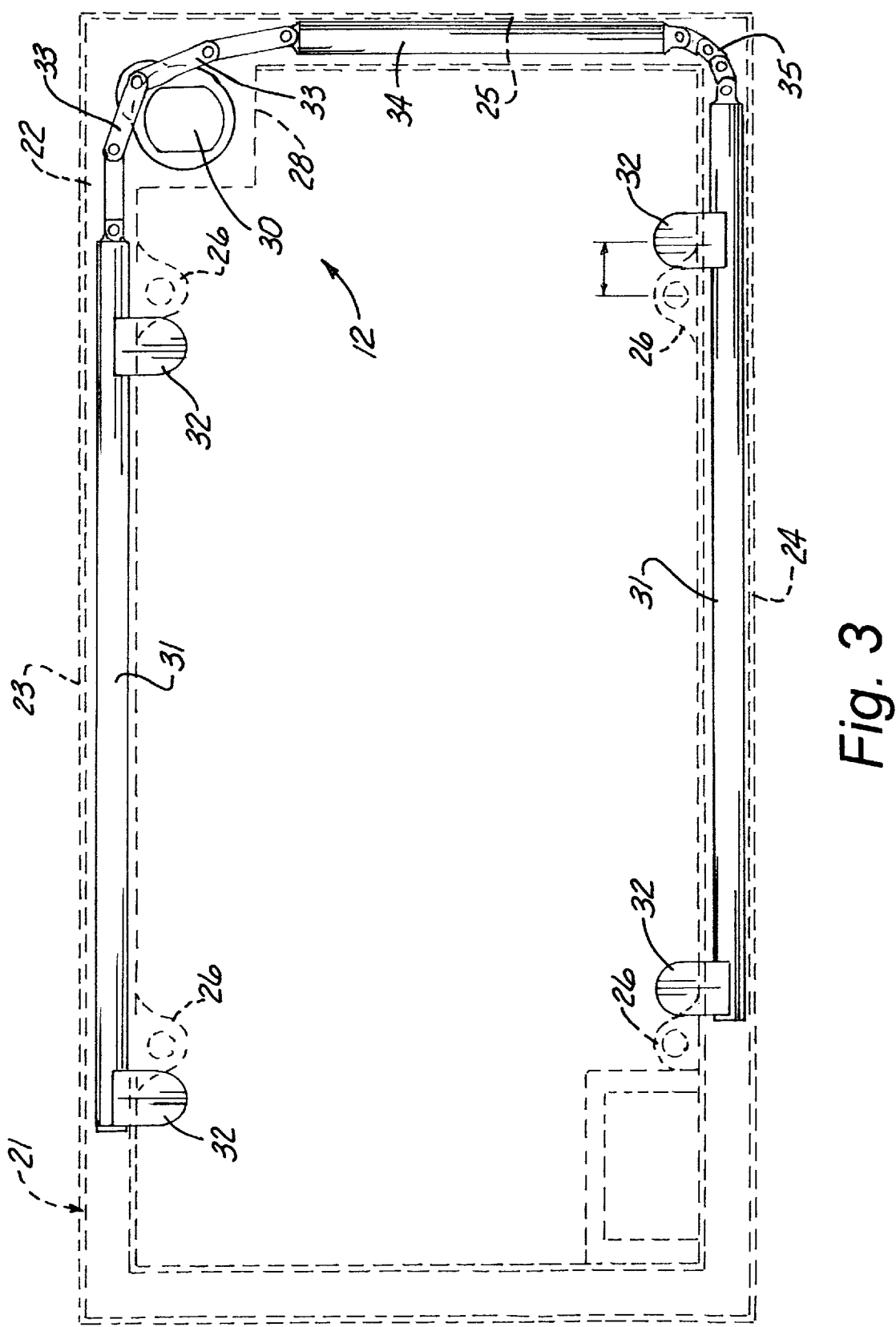
FIG. 3 is an isolated detail view of the locking unit in the unlocked position; and, FIG. 4 is an isolated detail view of the locking unit in the locked position.
Figure 4:
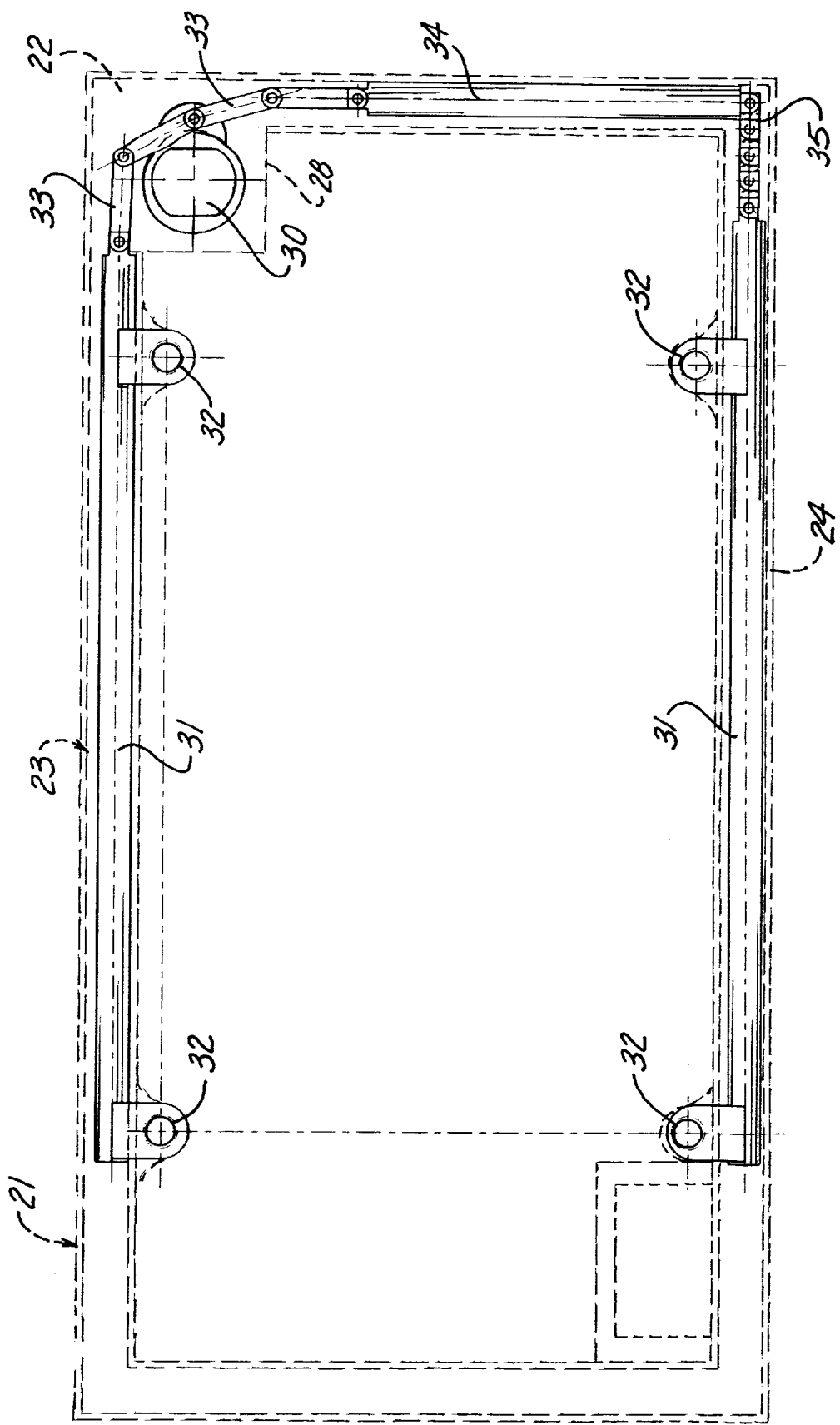

Turning now to FIGS. 3 and 4, it can be seen that the locking unit 12 comprises a lock member designated generally as 30 operatively connected to a pair of locking arms 31 slideably disposed in the upper 23 and lower 24 portions of the hollow framework element 21 wherein each of the locking arms 31 is provided with a plurality of cover tabs 32 which are dimensioned to project through the slots 27 in the framework element 21 to selectively cover the apertured mounting tabs 26 when the cover tabs are aligned as depicted in FIG. 4.

Still referring to FIGS. 3 and 4, it can be seen that the locking arms 31 are connected to one another by a plurality of linkage arms 33 operatively connected to the inboard end of the upper locking arm 31, the lock member 30, and the upper end of an elongated motion transmitting rod 34 slidably disposed on one side 25 of the framework element 21.

Furthermore, the lower end of the motion transmitting arm 34 is operatively connected to the inboard end of the lower locking arm 31 by a short length of chain 35 such that when the lock member 30 is in the position illustrated in FIG. 1, the cover tabs 32 will overlap the apertured mounting tabs 26. Then when the lock member 30 is disposed in the position illustrated in FIG. 2, the apertured mounting tabs can receive conventional license plate fasteners 50 for captively engaging the license plate 40 between the license plate holder 10 and a vehicle framework (not shown) in a well well recognized fashion.

Referring once more to FIGS. 1 and 3, it can be seen that a U-shaped element bracket 36 is attached to one corner of the framework element 21. This bracket element 36 can be selectively mounted in any corner of the license plate holder 10 in order to protect a state registration decal 37.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

I claim:

1. A lockable license plate holder for securing a license plate via a plurality of conventional fasteners to a vehicle framework; wherein, the license plate holder comprises:

a holder unit including a license plate member comprising an open generally rectangular framework element having a hollow upper portion, a hollow lower portion, and at least one hollow side defining a passageway within the framework element; wherein both the upper portion and the lower portion of the framework element are provided with a plurality of apertured mounting tabs dimensioned to receive said plurality of conventional fasteners and a slot disposed adjacent to each of said apertured mounting tabs; and a locking unit including a lock member operatively associated with a plurality of cover tabs slideably disposed within each slot for selectively covering and uncovering said apertured mounting tabs.

2. The license plate holder as in claim 1; wherein, said locking unit further includes a pair of locking arms provided with said plurality of cover tabs wherein one of said locking arms is slideably disposed in the upper portion of the framework element and the other of said locking arms is slideably disposed in the lower portion of the framework element; and, wherein both of said locking arms are operatively associated with said lock member.

3. The license plate holder as in claim 2; wherein, said locking unit further includes:

means for shifting the cover tabs from an exposed relationship to a covering relationship relative to said apertured mounting tabs.

4. The license plate holder as in claim 3; wherein, said means for shifting the cover tabs includes in part a plurality of linkage arms attached on one end to the locking arm in the upper portion of the framework element and operatively connected to the lock member.

5. The license plate holder as in claim 4; wherein, said means for shifting the cover tabs further includes: a motion transmitting bar slideably disposed in said at least one side of the framework element and having an upper end connected to the other end of said plurality of linkage arms.

6. The license plate holder as in claim 5; wherein, the motion transmitting bar has a lower end connected to the locking bar in the lower portion of the framework element by a short length of chain.

7. The license plate holder as in claim 1, wherein the interior of the open rectangular framework element is provided with at least one bracket element dimensioned to surround a registration decal disposed on a license plate.

8. A lockable license plate holder for attaching a license plate via a plurality of conventional fasteners to a vehicle framework wherein the license plate holder comprises:

a license plate holder housing member having an upper portion and a lower portion provided with a plurality of apertured mounting tabs dimensioned to receive said plurality of conventional fasteners;

means for selectively covering and uncovering said plurality of apertured mounting tabs;

wherein said means comprises at least in part, a plurality of cover tabs slideably disposed relative to the upper and lower portions of the housing member wherein the position of the plurality of cover tabs is controlled by a lock member; and wherein said plurality of cover tabs are affixed to a pair of locking arms slideably disposed in the tipper and lower, portions respectively of housing member.

9. The license plate holder as in claim 7, wherein said pair of locking arms are operatively connected to one another and to said lock member.

* * * * *